United States Patent
Tsai

(10) Patent No.: US 8,294,414 B2
(45) Date of Patent: Oct. 23, 2012

(54) RECHARGING DEVICE WITH VOLTAGE DETECTION FOR AN ALKALINE PRIMARY CELL

(75) Inventor: Ming-Lung Tsai, Taichung (TW)

(73) Assignee: Song Ho Kuang Environmental Technology Co., Ltd., Taichung (TW)

( * ) Notice: Subject to any disclaimer, the term of this patent is extended or adjusted under 35 U.S.C. 154(b) by 248 days.

(21) Appl. No.: 12/767,386

(22) Filed: Apr. 26, 2010

(65) Prior Publication Data
US 2011/0260693 A1  Oct. 27, 2011

(51) Int. Cl.
*H01M 6/50* (2006.01)
*H02J 7/00* (2006.01)
*H02J 7/04* (2006.01)
*H02J 7/16* (2006.01)

(52) U.S. Cl. ........................ 320/100; 320/145
(58) Field of Classification Search ................ 320/100, 320/141, 145
See application file for complete search history.

(56) References Cited

U.S. PATENT DOCUMENTS

| 5,998,968 | A * | 12/1999 | Pittman et al. | 320/130 |
| 7,612,523 | B2 * | 11/2009 | Li | 320/100 |
| 2008/0042619 | A1 * | 2/2008 | Li | 320/136 |
| 2011/0121788 | A1 * | 5/2011 | Tsai | 320/145 |

* cited by examiner

*Primary Examiner* — Ramy Ramadan
(74) *Attorney, Agent, or Firm* — Greenberg Traurig, LLP

(57) ABSTRACT

A recharging device with voltage detection for an alkaline primary cell includes an oscillating unit that generates a pulse signal from an input power to charge the alkaline primary cell. The recharging device also includes a detecting unit configured to be electrically coupled to the alkaline primary cell. The detecting unit is also configured to detect a voltage of the alkaline primary cell and output a corresponding detection signal. The recharging device further includes a control unit electrically coupled to the oscillating unit and the detecting unit. The control unit controls the oscillating unit to operate in one of a first charge mode and a waiting mode based on the detection signal output by the detecting unit. The oscillating unit outputs the pulse signal when operated in the first charge mode and discontinues output of the pulse signal when operated in the waiting mode.

10 Claims, 1 Drawing Sheet

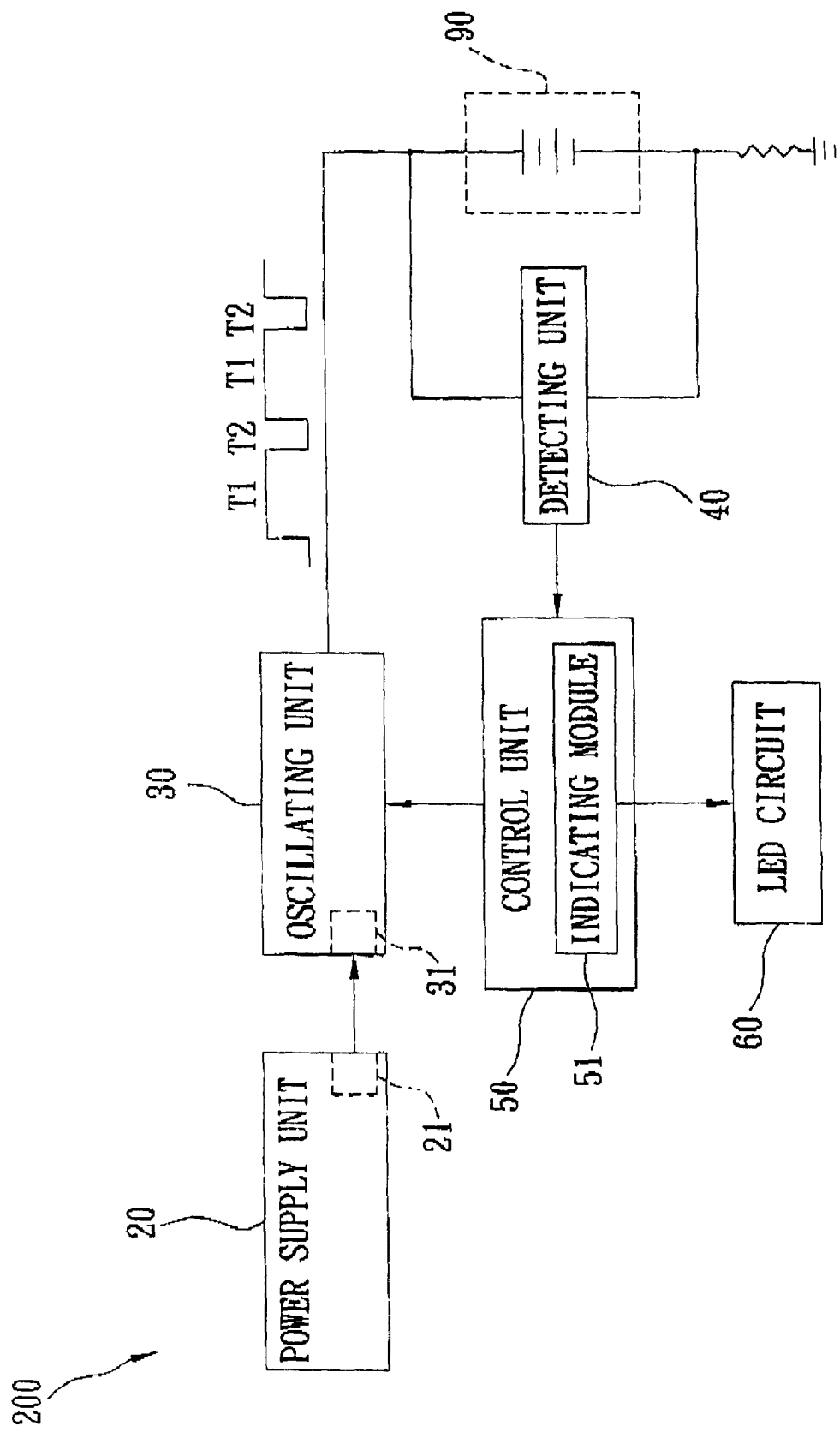

RECHARGING DEVICE WITH VOLTAGE DETECTION FOR AN ALKALINE PRIMARY CELL

BACKGROUND OF THE INVENTION

1. Field of the Invention

The invention relates to a recharging device for a primary cell, and more particularly to a recharging device with voltage detection for an alkaline primary cell.

2. Description of the Related Art

U.S. Pat. No. 7,612,523 discloses a conventional device for recovering voltage of a primary cell. The conventional device may use a temperature sensor to stop recharging operations when a battery temperature exceeding a threshold is detected. The conventional device may have several disadvantages. For example, the temperature sensor of the conventional device may fail to detect a dysfunctional primary cell charged by the conventional device until sufficient power has been used to raise the temperature of the primary cell up to the threshold temperature. This may result in a waste of power and an increased hazard associated with charging the dysfunctional primary cell. In addition, the temperature sensor of the conventional device may fail to detect an excessive temperature of a functional alkaline primary cell until over-charging has occurred.

SUMMARY OF THE INVENTION

Therefore, an object of the present invention is to provide a recharging device with voltage detection that determines whether an alkaline primary cell is functional to improve recharging safety.

Accordingly, a recharging device with voltage detection for the alkaline primary cell includes an oscillating unit that generates a pulse signal from an input power to charge the alkaline primary cell. The recharging device also includes a detecting unit configured to be electrically coupled to the alkaline primary cell. The detecting unit is also configured to detect a voltage of the alkaline primary cell and output a corresponding detection signal. The recharging device further includes a control unit electrically coupled to the oscillating unit and the detecting unit. The control unit controls the oscillating unit to operate in one of a first charge mode and a waiting mode based on the detection signal output by the detecting unit.

The oscillating unit outputs the pulse signal when operated in the first charge mode and discontinues output of the pulse signal when operated in the waiting mode. The pulse signal has two continuously alternating phases, including a charging phase and a detecting phase. During the charging phase, the pulse signal has a higher voltage for charging the alkaline primary cell. During the detecting phase, the pulse signal has a lower voltage such that charging of the alkaline primary cell is discontinued.

The control unit controls the oscillating unit to operate in the first charge mode when the voltage of the alkaline primary cell is in an effective voltage range. The control unit controls the oscillating unit to operate in the waiting mode when the voltage of the alkaline primary cell is outside the effective voltage range.

The preferred embodiment of the invention determines whether the alkaline primary cell is suitable for charging to prevent a waste of recharging power and to avoid a hazard associated with charging a dysfunctional battery. In addition, the preferred embodiment is adapted to operate in a detecting phase of a recharging mode to monitor power variation. When the voltage of the alkaline primary cell is outside an effective voltage range, the preferred embodiment operates in a waiting mode to stop recharging and to improve recharging safety. Accordingly, the recharging device of the preferred embodiment determines the functionality of the alkaline primary cell for recharging.

BRIEF DESCRIPTION OF THE DRAWINGS

Other features and advantages of the present invention will become apparent in the following detailed description of the preferred embodiments with reference to the accompanying drawings, of which:

FIG. 1 is a schematic circuit diagram of a recharging device with voltage detection for an alkaline primary cell, according to the preferred embodiment of the present invention.

DETAILED DESCRIPTION OF THE PREFERRED EMBODIMENT

Referring to FIG. 1, the preferred embodiment of a recharging device 200 with voltage detection for an alkaline primary cell 90 according to the present invention is configured for recovering power of the alkaline primary cell 90, and includes an oscillating unit 30, a detecting unit 40 and a control unit 50. The alkaline primary cell 90 may be an alkaline primary battery.

In this embodiment, the power supply unit 20 is configured for receiving an alternating current power source substantially between 100V and 240V for conversion to a direct current power source output at 5V. The power supply unit 20 includes an output interface 21 that includes a first USB port. An independently manufactured and sold adapter may be used as the power supply unit 20.

The oscillating unit 30 includes an input port 31 adapted for receiving the direct current power source through a plug connection. The input port 31 is an interface that includes a second USB port. The oscillating unit 30 uses the acquired power to oscillate and to generate a pulse signal to recharge the alkaline primary cell 90. In this embodiment, the input port 31 of the oscillating unit 30 is electrically coupled to the power supply unit 20 through a plug connection and the second USB port.

The detecting unit 40 is configured to be electrically coupled to the alkaline primary cell 90 for outputting a detection signal. The detection signal may correspond to a sampled voltage or an average voltage of the alkaline primary cell 90. The detecting unit 40 may continuously detect the voltage of the alkaline primary cell 90. In this embodiment, the detecting unit 40 includes an analog-to-digital (A/D) circuit.

The control unit 50 is electrically coupled to the oscillating unit 30 and the detecting unit 40, and includes an indicating module 51. An effective voltage range is established in the control unit 50. In the preferred embodiment, the effective voltage range is between 0.8V and 1.7V. Based on the detection signal output by the detecting unit 40, the control unit 50 determines whether the recharging device 200 operates in either a recharging mode or a waiting mode. The control unit 50 may control the operation mode of the recharging device 200 using the oscillating unit 30.

When the voltage of the alkaline primary cell 90 falls within the effective voltage range, the control unit 50 controls the oscillating unit 30 to operate in a first charge mode. In the first charge mode, the oscillating unit 30 outputs a pulse signal having two continuously alternating phases: a charging phase (T1) during which the pulse signal has a higher voltage for charging the alkaline primary cell 90; and a detecting phase (T2) during which the pulse signal has a lower voltage such that charging of the alkaline primary cell 90 is discontinued. The detecting phase (T2) may be used for detecting the voltage of the alkaline primary cell 90. In this embodiment, the duration of each charging phase (T1) of the first charge mode is 30 seconds, the duration of each detecting phase (T2) of the first charge mode is 10 seconds, and the detection signal output by the detecting unit 40 is the average voltage sampled during the detecting phase (T2).

When the oscillating unit 30 is in the first charge mode, the control unit 50 uses the indicating module 51 to output distinct charging indication signals that correspond to the charging phase (T1) and the detecting phase (T2), respectively. When the detected voltage is outside the effective voltage range, the control unit 50 uses the indicating module 51 to output a waiting indication signal. The control unit 50 may output a discard indication signal when the voltage of the alkaline primary cell 90 is less than the effective voltage range.

In this embodiment, the indicating module 51 uses a light-emitting diode circuit 60 that is coupled to the indicating module 51 and receives the charging indication signal and the waiting indication signal. The light-emitting diode circuit 60 outputs a red light to indicate the charging phase (T1) when the charging indication signal corresponding to the charging phase (T3) is received. The light-emitting diode circuit 60 outputs an orange light to indicate the detecting phase (T2) when the charging indication signal corresponding to the detecting phase (T2) is received. The light-emitting diode circuit 60 outputs a green light to indicate the waiting mode when the waiting indication signal is received.

Accordingly, when the alkaline primary cell 90 is placed in the recharging device 200 to form a recharging circuit, the control unit 50 actively determines whether the alkaline primary cell 90 is suitable for recharging using input from the detecting unit 40. The recharging device 200 thus prevents a waste of recharging power and time, and avoids a hazard associated with charging an unsuitable alkaline primary cell 90.

When the alkaline primary cell 90 is determined to be suitable for recharging, changes in power of the alkaline primary cell 90 are continuously monitored during the detecting phase of the recharging mode. In variations of the preferred embodiment, power of the alkaline primary cell 90 may be monitored intermittently. Monitoring may also take place in the charging phase of the charging mode and in the waiting mode. Continuous monitoring may refer to sampling at regular intervals or according to a predetermined schedule. The power level of the alkaline primary cell 90 may be determined from a voltage sample or an average voltage of the alkaline primary cell 90.

When the voltage of the alkaline primary cell 90 exceeds the effective voltage range, charging is completed and the waiting mode is entered to stop charging operation and to improve charging safety. The recharging device 200 thus actively determines whether the alkaline primary cell 90 is functional and suitable for charging.

If the alkaline primary cell 90 is left in the recharging device 200 for sufficient time after being charged, continuous discharge of the alkaline primary cell 90 may occur. The control unit 50 is therefore configured to initiate operation of a second charge mode for renewed charging of the alkaline primary cell 90. The second charge mode is initiated after operation of the first charge mode and when the voltage of the alkaline primary cell 90 falls below 1.4V. The second charge mode is used to maintain the alkaline primary cell 90 in an operational state.

The effective voltage range may be between 0.8 and 1.7 volts for alkaline primary cells 90 generally rated for 1.5V. Alkaline primary cells 90 with voltages of at least 0.8V are considered to possess usable internal chemical energy. Alkaline primary cells 90 with voltages below 0.8V are considered dysfunctional and may be discarded. On the other hand, if the alkaline primary cell 90 has a voltage greater than 1.7V, the pulse signal reduced during the charging phase (T1) until the waiting mode is entered. In the waiting mode, charging is stopped to improve safety.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A recharging device with voltage detection for an alkaline primary cell, said recharging device comprising:
   an oscillating unit that generates a pulse signal from an input power to charge the alkaline primary cell;
   a detecting unit configured to be electrically coupled to the alkaline primary cell, and to detect a voltage of the alkaline primary cell and output a corresponding detection signal; and
   a control unit electrically coupled to said oscillating unit and said detecting unit, said control unit controlling said oscillating unit to operate in one of a first charge mode and a waiting mode based on the detection signal output by said detecting unit,
   wherein said oscillating unit outputs the pulse signal when operated in said first charge mode and discontinues output of the pulse signal when operated in said waiting mode,
   the pulse signal having two continuously alternating phases, including a charging phase during which the pulse signal has a higher voltage for charging the alkaline primary cell, and a detecting phase during which the pulse signal has a lower voltage such that charging of the alkaline primary cell is discontinued,
   said control unit controlling said oscillating unit to operate in said first charge mode when the voltage of the alkaline primary cell is in an effective voltage range, and to operate in said waiting mode when the voltage of the alkaline primary cell is outside said effective voltage range;
   wherein a duration of said charging phase of said first charge mode is 30 seconds, a duration of said detecting phase of said first charge mode is 10 seconds, and said detection signal output by said detecting unit is an average voltage of the alkaline primary cell during said detecting phase.

2. The recharging device as claimed in claim 1, further comprising a power supply unit having an output interface, said power supply unit being configured for receiving an alternating current power substantially between 100 volts and 240 volts for conversion to a direct current power that is output at 5V using said output interface, said oscillating unit being coupled electrically to said power supply unit through said output interface.

3. The recharging device as claimed in claim 2, wherein said output interface of said power supply unit includes a first USB port, said direct current power being output at 5V using said first USB port, said oscillating unit being coupled electrically to said power supply unit through said first USB port.

4. The recharging device as claimed in claim 1, wherein said oscillating unit includes an input port having a second USB port.

5. The recharging device as claimed in claim 1, wherein said control unit includes an indicating module and is configured to send a waiting indication signal using said indicating module when said oscillating unit is operated in said waiting mode.

6. The recharging device as claimed in claim 5, wherein said control unit outputs a charging indication signal using said indicating module when said first charge mode is operating, said charging indication signal being changed by said control unit to correspond to said charging phase and said detecting phase.

7. A recharging device with voltage detection for an alkaline primary cell, said recharging device comprising:
   an oscillating unit that generates a pulse signal from an input power to charge the alkaline primary cell;
   a detecting unit configured to be electrically coupled to the alkaline primary cell, and to detect a voltage of the alkaline primary cell and output a corresponding detection signal; and
   a control unit electrically coupled to said oscillating unit and said detecting unit, said control unit controlling said oscillating unit to operate in one of a first charge mode and a waiting mode based on the detection signal output by said detecting unit,
   wherein said oscillating unit outputs the pulse signal when operated in said first charge mode and discontinues output of the pulse signal when operated in said waiting mode,
      the pulse signal having two continuously alternating phases, including a charging phase during which the pulse signal has a higher voltage for charging the alkaline primary cell, and a detecting phase during which the pulse signal has a lower voltage such that charging of the alkaline primary cell is discontinued,
   said control unit controlling said oscillating unit to operate in said first charge mode when the voltage of the alkaline primary cell is in an effective voltage range, and to operate in said waiting mode when the voltage of the alkaline primary cell is outside said effective voltage range;
   wherein said control unit includes an indicating module and is configured to send a waiting indication signal using said indicating module when said oscillating unit is operated in said waiting mode;
   wherein said control unit outputs a charging indication signal using said indicating module when said first charge mode is operating, said charging indication signal being changed by said control unit to correspond to said charging phase and said detecting phase;
   said recharging device further comprising a light-emitting diode circuit coupled to said indicating module and configured for receiving said charging indication signal and said waiting indication signal, said light-emitting diode circuit outputting a red light when said charging indication signal is received and corresponds to said charging phase, an orange light when said charging indication signal is received and corresponds to said detecting phase, and a green light when said waiting indication signal is received.

8. The recharging device of claim 5, wherein said control unit outputs a discard indication signal using said indicating module when the voltage of the alkaline primary cell is less than the effective voltage range.

9. The recharging device as claimed in claim 1, wherein said control unit is configured to initiate operation of a second charge mode for renewed charging of the alkaline primary cell after operation of said first charge mode and when the voltage of said alkaline primary cell is below 1.4 volts.

10. The recharging device of claim 1, wherein the effective voltage range is substantially between 0.8 volts and 1.7 volts.

* * * * *